United States Patent
Johnsson et al.

[11] 3,896,700
[45] July 29, 1975

[54] DRIVING AND STEERING SYSTEM FOR A MOTOR VEHICLE

[75] Inventors: Stig Arthur Johnsson; Karl Sten Rudolf Hultgren, both of Karlskoga, Sweden

[73] Assignee: AB Bofors, Bofors, Sweden

[22] Filed: Dec. 21, 1973

[21] Appl. No.: 427,189

[30] Foreign Application Priority Data
Jan. 17, 1973 Sweden.............................. 7300599

[52] U.S. Cl................................. 89/40 C; 180/6.48
[51] Int. Cl............................................. F41f 23/24
[58] Field of Search......... 180/6.48, 6.66, 6.2, 19 R; 89/40 C

[56] References Cited
UNITED STATES PATENTS

| | | | |
|---|---|---|---|
| 1,377,603 | 5/1921 | Schneider | 89/40 C |
| 2,046,424 | 7/1936 | Palen | 89/40 C |
| 3,567,051 | 3/1971 | Bell | 180/6.48 |
| 3,616,869 | 11/1971 | Rilling | 180/6.48 |

FOREIGN PATENTS OR APPLICATIONS

| | | | |
|---|---|---|---|
| 1,090,549 | 10/1960 | Germany | 89/40 C |

Primary Examiner—David Schonberg
Assistant Examiner—John A. Pekar
Attorney, Agent, or Firm—Elliott I. Pollock

[57] ABSTRACT

A wheeled motor-driven artillery piece comprises a carriage supporting a gun thereon. The carriage includes a pair of driving wheels each of which is driven separately by a reversible hydraulic motor, the hydraulic motors being fed from hydraulic pumps and each pump being controlled independently of the other by manually operated controls. The main drive source comprises an internal combustion engine positioned below the gun at substantially the level of the driving wheel shafts and at a location adjacent to and forward of said shafts. The carriage further includes a pair of carriage trails extending rearwardly of the drive wheels and respectively supporting a pair of central castered, freely rotatable wheels which are horizontally spaced from one another by a distance substantially equal to the horizontal spacing between the driving wheels.

3 Claims, 3 Drawing Figures

DRIVING AND STEERING SYSTEM FOR A MOTOR VEHICLE

The present invention relates to a motor vehicle, particularly a motor-driven artillery piece. The invention particularly relates to a driving and steering system for such a motor vehicle.

For such vehicles as wheeled, motor-driven guns, it is a desire to achieve a driving and steering system which is easy for the driver to operate and which gives the vehicle good handling properties, a small turning radius and also good cross-country mobility.

In order to fulfil the above-mentioned desires, according to the invention an improved gun support and associated driving and steering system has been achieved, which is mainly characterized by the features to be discussed hereinafter.

Figure 1:
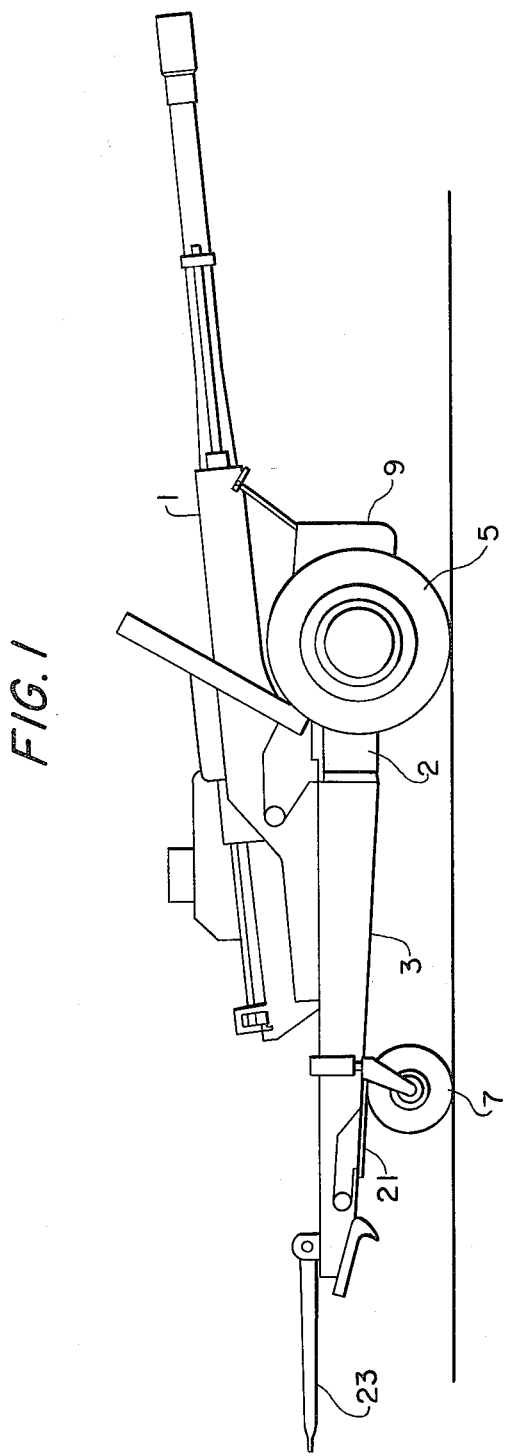
Figure 2:
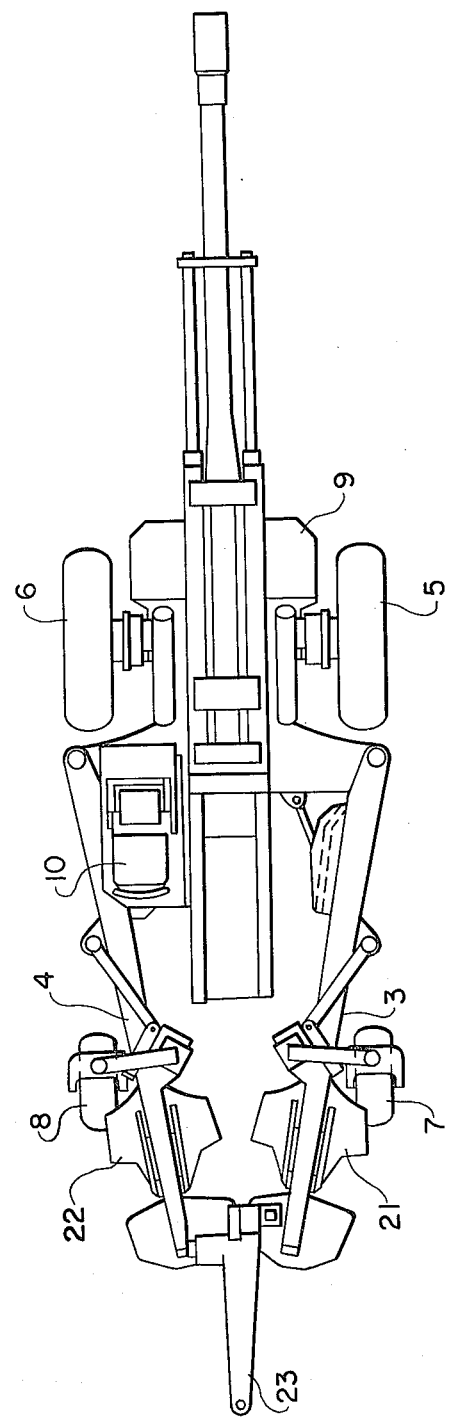
Figure 3:
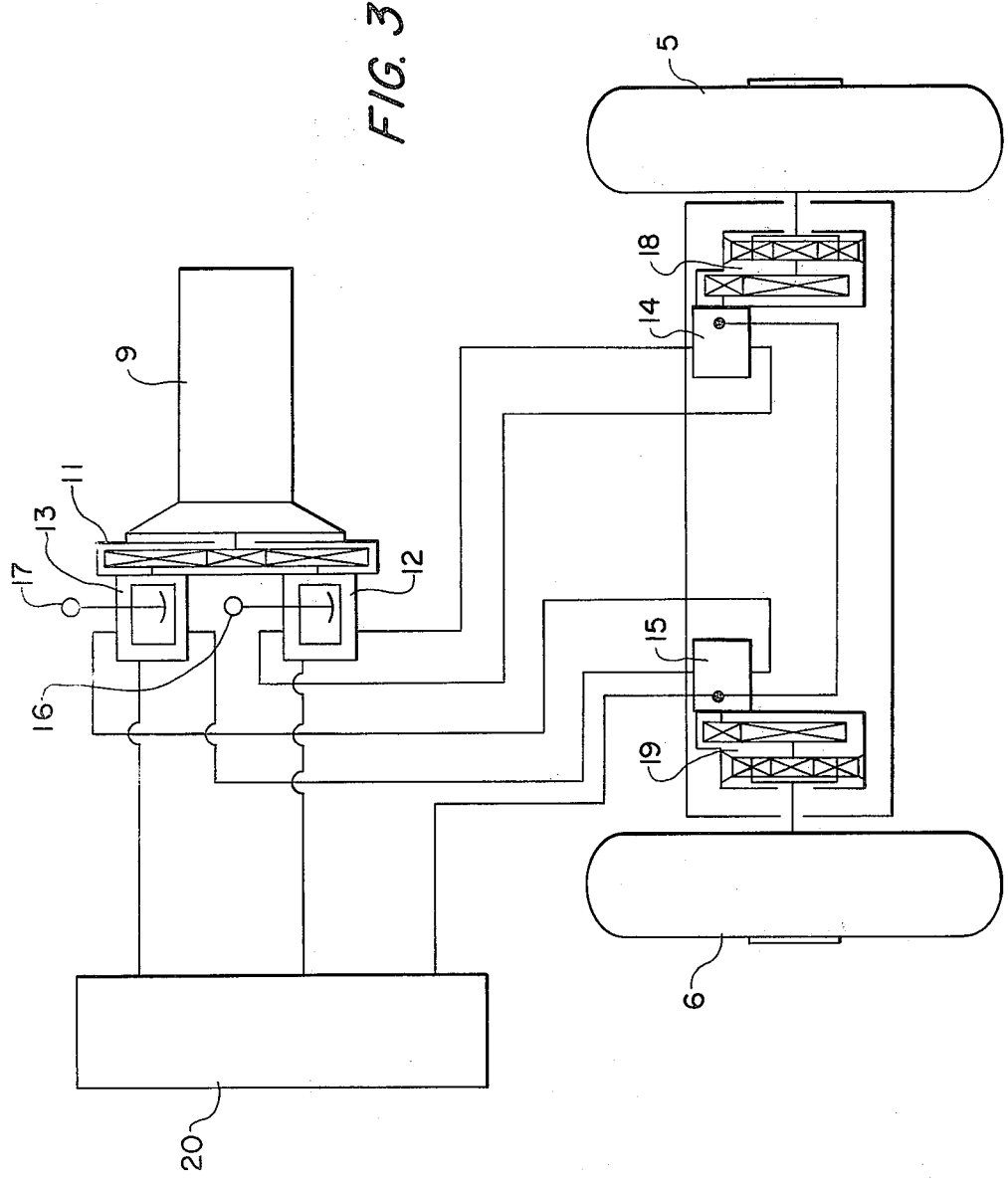

An embodiment of the invention will be described in more detail in the following, with reference to the attached drawings, in which FIGS. 1 and 2 show a schematic side view and a plan view from above, respectively, of a wheeled gun, and FIG. 3 shows a block diagram of the driving system for the gun shown in FIGS. 1 and 2.

The artillery piece shown in the drawing is generally designated 1, and is provided with a wheeled carriage 2 with two carriage trails 3 and 4. The gun 1 itself does not constitute any part of the invention, and will therefore not be further described. The wheeled carriage 2 has two front driving wheels 5, 6 and two central castered rear supporting wheels 7, 8. The wheels 7, 8 are mounted on the carriage trails at positions rearward of gun 1, are spaced from one another by a distance substantially equal to the spacing between the driving wheels 5, 6 (as best shown in FIG. 2), and are freely rotatable so-called pivot wheels. Further, the carriage trails 3, 4 are provided with trail spades 21, 22 as well as a coupling device 23. The artillery piece is driven by means of an internal combustion engine 9 which is disposed below gun 1 at substantially the same height as and forward of the shafts of wheels 5, 6 (as shown in FIGS. 1 and 2). The wheeled artillery piece is operated from a driver's position 10 by manipulation of manual controls 16, 17 (FIG. 3).

In the hydrostatic driving and steering system shown schematically in FIG. 3, the engine 9, via a distribution gear 11, drives two hydraulic pumps 12, 13, each of which are connected by means of pipes to its hydraulic motor 14 and 15, respectively, arranged at the respective driving wheel. The pumps 12, 13 are of the type that has variable displacement, and can be controlled infinitely variably by means of control levers 16, 17, for driving of the hydraulic motors 14, 15, respectively, with the desired rotating speed and direction. The hydraulic motors 14, 15, which are reversible, drive the wheels 5, 6, respectively, via reduction gears 18, 19. The pumps 12, 13 are fed with hydraulic medium from a tank 20, to which the medium is returned from the motors 14, 15.

With the aid of the control levers 16, 17 the driver can regulate the rotating speed of the driving wheels individually, and when the rotating speeds are different, the vehicle will thus turn. As the supporting wheels 7, 8 pivot without limitation, it is also possible to turn the vehicle around on the spot by allowing the driving wheels to rotate in opposite directions.

We claim:

1. A wheeled motor-driven artillery piece comprising a carriage supporting a gun thereon, a pair of horizontally spaced driving wheels supported for rotation on shafts at opposing sides of said carriage respectively, a pair of carriage trails extending from said carriage rearwardly of said driving wheels, a pair of horizontally spaced, freely rotatable wheels pivotally mounted on said pair of carriage trails respectively at positions rearward of said driving wheels, the horizontal spacing between said pair of freely rotatable wheels being substantially equal to the horizontal spacing between said pair of driving wheels, and means for driving and steering said artillery piece comprising a pair of individually reversible hydraulic motors separately coupled to said pair of driving wheels respectively, a pair of hydraulic pumps connected to said pair of hydraulic motors respectively, each of said pumps including a manually operable control for individually controlling the output of each pump independently of the other pump thereby to permit individual control of the speed and direction of rotation of each of said driving wheels, and an engine for driving said pumps, said engine being located below said gun at substantially the level of said driving wheel shafts at a position adjacent to and forward of said shafts.

2. The artillery piece of claim 1 wherein each of said freely rotatable wheels comprises a central castered wheel.

3. The artillery piece of claim 2 wherein the upper side of said carriage includes means defining a driver position for carrying a driver on said carriage adjacent the rear end of said gun, said manually operable controls being located at said driver position for manipulation by the driver of said artillery piece, said pair of central castered wheels being located rearward of said driver position.

* * * * *